(12) United States Patent
Liu et al.

(10) Patent No.: US 7,584,910 B2
(45) Date of Patent: Sep. 8, 2009

(54) METHOD OF PREPARING AN AGGREGATE METAL OXIDE PARTICLE DISPERSION HAVING A DESIRED AGGREGATE PARTICLE DIAMETER

(75) Inventors: Joanne Liu, Reading, MA (US); Yakov E. Kutsovsky, Arlington, MA (US)

(73) Assignee: Cabot Corporation, Boston, MA (US)

( * ) Notice: Subject to any disclaimer, the term of this patent is extended or adjusted under 35 U.S.C. 154(b) by 770 days.

(21) Appl. No.: 11/121,591

(22) Filed: May 4, 2005

(65) Prior Publication Data

US 2006/0088783 A1    Apr. 27, 2006

Related U.S. Application Data

(60) Provisional application No. 60/568,572, filed on May 4, 2004.

(51) Int. Cl.
*B02C 19/00* (2006.01)
(52) U.S. Cl. .......................................... 241/21; 241/29
(58) Field of Classification Search .................. 241/21, 241/172, 29; 423/337, 324; 430/137.14; 524/492
See application file for complete search history.

(56) References Cited

U.S. PATENT DOCUMENTS

| | | | |
|---|---|---|---|
| 3,126,293 A | 3/1964 | McSheehy et al. | |
| 4,544,359 A | 10/1985 | Waknine | |
| 5,116,535 A | 5/1992 | Cochrane | |
| 5,246,624 A | 9/1993 | Miller et al. | |
| 5,278,221 A | 1/1994 | Siddiqui | |
| 5,704,566 A | 1/1998 | Schutz et al. | |
| 5,904,159 A | 5/1999 | Kato et al. | |
| 6,130,272 A * | 10/2000 | Dopp et al. | 523/212 |
| 6,248,144 B1 | 6/2001 | Tamai et al. | |
| 6,638,982 B2 | 10/2003 | Brown | |
| 6,663,683 B2 | 12/2003 | Lortz et al. | |
| 6,676,719 B2 | 1/2004 | Lortz et al. | |
| 6,695,907 B2 | 2/2004 | Scharfe et al. | |
| 6,699,808 B1 | 3/2004 | Schwertfeger et al. | |
| 6,896,958 B1 * | 5/2005 | Cayton et al. | 428/323 |
| 2001/0055558 A1 | 12/2001 | Kogoi et al. | |
| 2002/0121156 A1 | 9/2002 | Menzel et al. | |

(Continued)

FOREIGN PATENT DOCUMENTS

BR    1 326 574    8/1973

(Continued)

*Primary Examiner*—Mark Rosenbaum

(57) ABSTRACT

A method of preparing a dispersion of aggregate metal oxide particles having a pre-selected average aggregate particle diameter comprising pre-selecting a desired percent-reduction in the average aggregate particle diameter of the metal oxide particles, providing a dispersion standard pertaining to a dispersion of the aggregate metal oxide particles, wherein the dispersion standard correlates (i) the solids concentration of the dispersion with (ii) the percent-reduction in the aggregate particle diameter of the aggregate metal oxide particles that occurs when the dispersion is milled in a high-shear mixer, and preparing and milling a dispersion of the aggregate metal oxide particles in a high-shear milling device at a solids concentration that is within 10% of the solids concentration determined by the standard to provide a dispersion of aggregate metal oxide particles having the desired average aggregate particle diameter. Also provided is a method for reducing the average aggregate particle diameter of aggregate metal oxide particles, and a dispersion prepared by the method.

73 Claims, 3 Drawing Sheets

| U.S. PATENT DOCUMENTS | | |
|---|---|---|
| 2002/0134027 A1 | 9/2002 | Lortz et al. |
| 2003/0124321 A1 | 7/2003 | Schneider et al. |
| 2003/0180549 A1 | 9/2003 | Noguchi et al. |
| 2004/0020134 A1 | 2/2004 | Kim et al. |
| 2004/0126572 A1* | 7/2004 | Morris et al. ............... 428/328 |

| FOREIGN PATENT DOCUMENTS | | |
|---|---|---|
| EP | 0 876 841 A1 | 11/1998 |
| JP | 2003-268354 A | 9/2003 |
| WO | WO 03/103816 A2 | 12/2003 |
| WO | WO 2004/026766 A1 | 4/2004 |

* cited by examiner

METHOD OF PREPARING AN AGGREGATE METAL OXIDE PARTICLE DISPERSION HAVING A DESIRED AGGREGATE PARTICLE DIAMETER

CROSS-REFERENCE TO RELATED APPLICATIONS

This patent application claims priority to U.S. Provisional Patent Application No. 60/568,572, filed May 4, 2004.

FIELD OF THE INVENTION

This invention pertains to a method for preparing a metal oxide particle dispersion having a desired aggregate particle diameter, and to a dispersion prepared by the method.

BACKGROUND OF THE INVENTION

Pyrogenically produced metal oxide particles, such as fumed metal oxides, are typically prepared by passing a metal oxide precursor compound, such as a metal tetrachloride compound, through a flame. The metal oxide precursor compound is converted into small, spherical molten particles of metal oxide referred to as primary particles. During the process, the primary particles collide with one another, such that the primary particles become fused together into larger, three-dimensional, chain-like aggregate particles. The aggregate particles also can become entangled with one another to form even larger agglomerated particles. Agglomerates, however, are loosely associated structures that can break down into individual aggregate particles under normal dispersion conditions. The primary particles that form the aggregates, by contrast, are held together by strong forces and will not usually break apart upon dispersing the aggregate particles under normal dispersion conditions.

Since the aggregate particle is comprised of fused primary particles, the aggregate particle diameter of metal oxide particles prepared by conventional pyrogenic methods is a function of the primary particle diameter. The primary particle diameter, in turn, determines the surface area of the metal oxide particle. Thus, the aggregate particle diameter of these types of metal oxide particles is related to the surface area of the particles. This detracts from the usefulness of such dispersions when, for example, a smaller aggregate particle diameter is needed than is available for a given surface area.

A need exists for a method of preparing dispersions of metal oxide particles having desired aggregate particle diameters. The invention described herein provides such a method. These and other advantages of the invention will be apparent from the description of the invention provided herein.

BRIEF SUMMARY OF THE INVENTION

The invention provides a method of preparing a dispersion of aggregate metal oxide particles having a pre-selected average aggregate particle diameter comprising (a) providing aggregate metal oxide particles comprised of fused primary particles having an average aggregate particle diameter and an average primary particle diameter, (b) pre-selecting a desired percent-reduction in the average aggregate particle diameter of the metal oxide particles to provide a pre-selected average aggregate particle diameter, (c) providing a dispersion standard pertaining to the aggregate metal oxide particles, wherein the dispersion standard correlates (i) the solids concentration of the dispersion with (ii) the percent-reduction in the aggregate particle diameter of the aggregate metal oxide particles that occurs when the dispersion is milled in a high-shear mixer, (d) determining a solids concentration that correlates to the pre-selected percent-reduction in the average aggregate particle diameter by reference to the dispersion standard, (e) combining the aggregate metal oxide particles of step (a) with water to provide a dispersion having a solids concentration that is within 10% of the solids concentration determined in step (d), and (f) milling the dispersion in a high-shear milling device to provide a dispersion of aggregate metal oxide particles having about the pre-selected average aggregate particle diameter.

In a related aspect, the invention provides a method of preparing a dispersion of aggregate metal oxide particles, especially aggregate silica particles, having a pre-selected average aggregate particle diameter comprising (a) providing aggregate metal oxide particles comprising fused primary particles having an average primary particle diameter ($d_p$) and an average aggregate particle diameter ($D_{circ\ ave}$), (b) pre-selecting a desired percent-reduction in the average aggregate particle diameter (% $\Delta_{Dcirc\ ave}$) of about 10% to about 60% to provide a pre-selected average aggregate particle diameter, (c) combining the aggregate metal oxide particles with acidified or basified water to provide a dispersion of aggregate metal oxide particles, wherein the amount of aggregate metal oxide particles in the dispersion is within the range 0.8 L-1.2 L, and L is determined by the following equation:

$$L(\text{wt. \%}) = [(\% \Delta_{Dcirc\ ave}) \times (0.1 \ln(d_p)(\text{nm}) + 0.2)] \div 0.3,$$

and (d) milling the aggregate metal oxide particle dispersion using a high-shear mixer, whereby the aggregate particle diameter of the aggregate metal oxide particles is reduced to provide a dispersion of aggregate metal oxide particles having about the pre-selected average aggregate particle diameter.

The invention also provides method of reducing the aggregate particle diameter of aggregate metal oxide particles comprising (a) providing aggregate metal oxide particles comprised of fused primary particles having an average aggregate particle size, (b) combining the aggregate metal oxide particles with water comprising an acid or a quaternary ammonium hydroxide to provide a dispersion having a viscosity ($\eta$), (b) milling the aggregate metal oxide particle dispersion in a high-shear blade-type mixer, wherein the mixer comprises a blade having a radius ($R$), a characteristic blade length ($X$), and an angular velocity ($\omega$) that satisfies the following equation:

$$100 \geq \frac{\eta \omega^2 R^2}{2X^2} \geq 20 \text{ kW/m}^3,$$

whereby the average aggregate particle diameter of the aggregate metal oxide particles is reduced.

The invention further provides a method of reducing the aggregate particle diameter of aggregate silica particles comprising (a) providing aggregate silica particles comprising fused primary particles having an average aggregate particle diameter and a BET surface area of about 135 m²/g or more (b) combining the aggregate silica particles with acidified or basified water in sufficient quantities to provide a dispersion comprising about 30-50 wt. % aggregate silica particles, and (b) milling the aggregate silica particle dispersion in a high-shear blade-type mixer, whereby the average aggregate particle diameter of the aggregate silica particles is reduced.

In addition, the invention provides a method of reducing the aggregate particle diameter of aggregate silica particles comprising (a) combining aggregate silica particles comprising fused primary particles having an average aggregate particle diameter and a surface area of about 115 m²/g or more with water and a quaternary ammonium hydroxide in sufficient quantities to provide a dispersion comprising about 30 wt. % or more aggregate silica particles, and (b) milling the aggregate silica particles using a high-shear mixer, whereby the average aggregate particle diameter of the aggregate silica particles is reduced.

According to another aspect of the invention, a method of reducing the aggregate particle diameter of aggregate alumina particles is provided, which method comprises (a) combining aggregate alumina particles comprising fused primary particles having an average aggregate particle diameter with water and about 0.02-0.4 mols of an acid per kilogram of alumina to provide a dispersion comprising about 30 wt. % or more aggregate alumina particles, and (b) milling the dispersion using a high-shear mixer, whereby the average aggregate particle diameter of the aggregate alumina particles are reduced.

Also part of the invention is an aqueous dispersion of metal oxide particles prepared in accordance with the invention. In particular, the invention provides a dispersion of aggregate silica particles having an aggregate structure comprised of fused primary particles, wherein the aggregate silica particles have a primary particle diameter and an aggregate particle diameter, and the average of the primary particle diameters ($d_p$), the average (by number) of the aggregate particle diameters ($D_{circ\ ave}$) and the geometric standard deviation of the aggregate particle diameters ($\sigma_g$ ($D_{circ}$)) satisfies at least one of the two following equations:

$$D_{circ\ ave}(nm) < 52 + 2d_p(nm), \text{ and} \quad (1)$$

$$\sigma_g(D_{circ}) < 1.44 + 0.011 d_p(nm). \quad (2)$$

The invention also provides a dispersion of aggregate alumina particles having an aggregate structure comprised of fused primary particles, wherein the aggregate alumina particles have a primary particle diameter and an aggregate particle diameter, and the average of the primary particle diameters ($d_p$), the average (by number) of the aggregate particle diameters ($D_{circ\ ave}$) and the geometric standard deviation of the aggregate particle diameters ($\sigma_g(D_{circ})$) satisfies at least one of the two following equations:

$$D_{circ\ ave}(nm) < 35 + 1.8 d_p(nm), \text{ and} \quad (1)$$

$$\sigma_g(D_{circ}) < 1.39 + 0.011 d_p(nm). \quad (2)$$

DETAILED DESCRIPTION OF THE INVENTION

The invention provides a method for preparing a dispersion of aggregate metal oxide particles having a desired average aggregate particle diameter. The term "aggregate metal oxide particle," as used herein, refers to a metal oxide particle comprised of primary particles that are fused together into three-dimensional, chain like aggregates, such as pyrogenically-prepared metal oxides or fumed metal oxides. The aggregate particle diameter, $D_{circ}$, is defined as the diameter of a circle having the same area as the aggregate, A, which can be measured by any suitable method, such as TEM image analysis according to ASTM Standard D3849. Once the area of the aggregates, A, has been determined, the aggregate diameter, $D_{circ}$, can be calculated using the following equation $D_{circ} = \sqrt{4A/\pi}$. The average aggregate particle diameter, $D_{circ\ ave}$, is the number-average of the aggregate particle diameters.

The term "average primary particle diameter" refers to the average diameter of the individual primary particles that make up the aggregate particles. Primary particle diameters referred to herein are calculated from the BET specific surface area (SA) of the aggregate metal oxide particles. Methods for calculating the primary particle size from the BET surface area for the various types of aggregate metal oxide particles are known. For instance, the primary particle size of aggregate fumed silica is related to the surface area by the following equation: $d_{p\ silica} = 1941/SA$ (m²/g). The equation for fumed alumina is as follows: $d_{p\ alumina} = 1220/SA$ (m²/g).

The term "dispersion," as used herein, refers to a dispersion of the aggregate metal oxide particles in a liquid dispersing medium. The term "solids concentration," as used herein, refers to the total concentration of solids in the dispersion, which includes the solid metal oxide particles as well as any other solids that may be present in the dispersion (e.g., fillers, milling aids, etc.)

Figure 1:
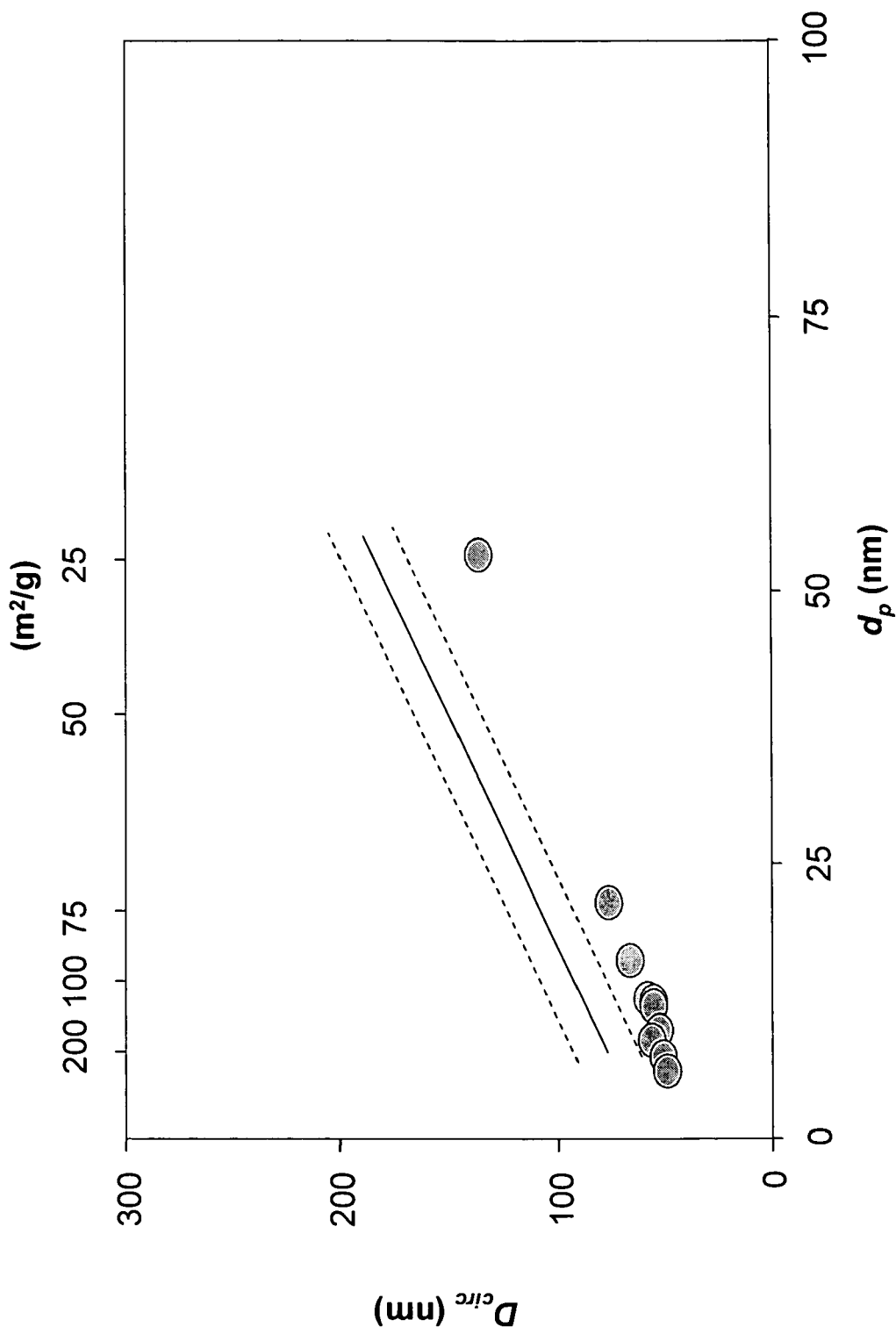
FIG. 1 is a graph of average aggregate particle size ($D_{circ}$) plotted against primary particle diameter ($d_p$) (bottom axis) and correlating BET surface area (m²/g) (top axis) for fumed silica particles. The straight lines indicate the range of aggregate particle diameters prior to milling, and the circular data points indicate the average aggregate particle diameters of a dispersion of fumed silica particles after milling at the maximum dispersible solids concentration.

The invention provides a method by which a dispersion of aggregate metal oxide particles can be prepared having a desired aggregate particle diameter, without changing the surface area of the particles. FIG. 1 shows the average aggregate particle diameter of aggregate metal oxide particles prepared by conventional pyrogenic processes (straight lines), which is a function of the primary particle size (e.g., surface area) of the particles as illustrated by FIG. 1. The circular data points on the graph represent the average aggregate particle size of aggregate metal oxide particles prepared in accordance with the invention (Example 1). This figure illustrates the use of the invention to provide an aggregate particle diameter that is reduced as compared to the conventionally prepared particles.

According to one aspect of the invention, the method of preparing a dispersion of aggregate metal oxide particles having a pre-selected average aggregate particle diameter comprises (a) providing aggregate metal oxide particles comprised of fused primary particles having an average aggregate particle diameter and an average primary particle diameter, (b) pre-selecting a desired percent-reduction in the average aggregate particle diameter of the metal oxide particles to provide a pre-selected average aggregate particle size, (c) providing a dispersion standard for a dispersion of the aggregate metal oxide particles, wherein the dispersion standard correlates (i) the solids concentration of the dispersion with (ii) the percent-reduction in the aggregate particle diameter of the aggregate metal oxide particles that occurs when the dispersion is milled in a high-shear mixer, (d) determining a solids concentration that correlates to the pre-selected percent-reduction in the average aggregate particle diameter of the metal oxide particles by reference to the dispersion standard, (e) combining the aggregate metal oxide particles with water or other suitable dispersion liquid to provide a dispersion having a solids concentration that is within 10% of the solids concentration determined in step (d), and (f) milling the dispersion in a high-shear milling device to provide a dispersion of aggregate metal oxide particles having about the pre-selected average aggregate particle diameter.

The method of the invention can be used with aggregate metal oxide particles of any type. Suitable aggregate metal oxide particles include pyrogenically produced silica particles (e.g., fumed silica particles), alumina particles (e.g., fumed alumina particles), ceria particles (e.g., fumed ceria particles), or a mixture thereof. Preferred aggregate metal oxide particles are pyrogenically produced alumina particles (e.g., fumed alumina particles) and, especially, pyrogenically produced silica particles (e.g., fumed silica particles).

Similarly, the method of the invention is not limited to aggregate metal oxide particles of any specific particle size or surface area. Typically, aggregate metal oxide particles have an average aggregate particle diameter of about 50-500 nm (e.g., 65-200 nm), with BET specific surface areas of about 25-500 m$^2$/g (e.g., 35-400 m$^2$/g). The aggregate particle diameter and surface area of the aggregate metal oxide particles used will depend, at least in part, upon the desired application. In some instances, higher surface area aggregate metal oxide particles are desirable, especially aggregate metal oxide particles having surface areas of about 115 m$^2$/g or more, or even about 135 m$^2$/g or more (e.g., about 135-500 m$^2$/g or more), such as about 150 m$^2$/g or more (e.g., about 165-500 m$^2$/g). In other instances lower surface areas are preferred, such as surfaces areas of about 110 m$^2$/g or less (e.g, 30-100 m$^2$/g, or 50-75 m$^2$/g).

Aggregate metal oxide particles in the dispersions prepared in accordance with the invention have a reduced average aggregate particle diameter as compared to the average aggregate particle diameter of an aggregate metal oxide particle of the same primary particle size (e.g., surface area). Any desired percent-reduction in the aggregate particle diameter of the aggregate metal oxide particles can be chosen. Generally, the percent-reduction will be about 10% or more, or even about 20% or more. While in theory there is no upper limit on the percent reduction in aggregate particle diameter that can be achieved with the invention, as a practical matter, the percent-reduction in particle diameter will usually be about 60% or less, or about 50% or less (e.g., 40% or less). Thus, the percent-reduction in particle diameter will typically be with the range of about 10-60%, such as about 15-50%, or even 20-40%. While the actual percent-reduction in aggregate particle diameter will approximate the pre-selected desired percent reduction, it may not in all cases be exactly the same as the pre-selected desired percent reduction. Preferably, the actual percent-reduction will be within about 15% of the pre-selected percent-reduction value, more preferably within about 10% or even within about 5% of such value.

The dispersion standard correlates the desired percent-reduction in aggregate particle diameter with a solids concentration for a dispersion of the aggregate metal oxide particles that, when milled in a high-shear milling device, will provide the desired percent-reduction in particle diameter. The dispersion standard can be prepared by any suitable method for correlating the solids concentration of the aggregate metal oxide dispersion with the percent-reduction in average aggregate particle diameter that can be achieved by milling the dispersion at that solids concentration. One such method for providing the dispersion standard comprises (i) preparing two or more (preferably three or more) dispersions of aggregate metal oxide particles having the same primary particle diameter, wherein each dispersion has a different solids concentration, (ii) milling the dispersions in a high-shear mixer, (iii) calculating the percent-reduction in average aggregate particle diameter for each dispersion by comparing the average aggregate particle diameter of each milled dispersion with the average aggregate particle diameter of the dispersion before milling, and (iv) describing the correlation between the solids concentration of the dispersions and the percent-reduction in average aggregate particle diameter.

The standard can be specific to an aggregate metal oxide particle of a specific primary particle diameter (e.g., specific surface area). In this case, a different standard would be needed for metal oxides of different primary particle diameters (e.g., different surface areas). Alternatively, the standard can be generalized in such a way that it correlates percent-reduction in aggregate particle diameter with the required solids concentration for any given primary particle diameter or surface area. One method of providing such a standard is set forth in the examples.

Of course, the method of the invention is not limited to the methods for providing a dispersion standard described herein. As those of ordinary skill in the art can appreciate, variations on the above method, as well as other methods, can be used to provide a dispersion standard suitable for the purposes of the invention. Similarly, the method is not limited to a dispersion standard that uses any particular mode of describing the correlation between solids concentration and percent-reduction in aggregate particle diameter, provided that it enables one of ordinary skill in the art to discern the appropriate solids concentration to use in order to obtain a desired percent-reduction aggregate particle diameter. Typically, the dispersion standard will be in the form of a formula, equation, graph, plot, or chart that correlates average aggregate particle diameter or percent-reduction in the average aggregate particle diameter with solids concentration. However, the description may also be in the form of text, schedule, or any other suitable form.

The dispersion standard set forth by formula (I), below, was developed by the methods set forth herein and in the examples, wherein the standard is stated with greater particularity. This standard pertains generally to any type of aggregate metal oxide particles, and more specifically to aggregate silica particles:

$$L(\text{wt. \%}) = [(\% \Delta_{Dcirc\ ave}) \times (0.1 \ln(d_p)(\text{nm}) + 0.2)] \div 0.3 \quad (I)$$

wherein L is the solids concentration of the dispersion, % $\Delta_{Dcirc\ ave}$ is the percent-reduction in average aggregate particle diameter, and $d_p$ is the average primary particle diameter of the aggregate metal oxide particles. In this regard, the invention provides the foregoing method for preparing a dispersion of aggregate metal oxide particles, especially aggregate silica particles, wherein the standard is provided by formula (I), above. The invention also contemplates a method of preparing a dispersion of aggregate metal oxide particles having a pre-selected average aggregate particle diameter comprising (a) providing aggregate metal oxide particles, especially aggregate silica particles, comprising fused primary particles having an average primary particle diameter ($d_p$) and an average aggregate particle diameter ($D_{circ\ ave}$), (b) pre-selecting a desired percent-reduction in the average aggregate particle diameter (% $\Delta_{Dcirc\ ave}$) of about 10% to about 60%, (c) combining the aggregate metal oxide particles with water to provide a dispersion of aggregate metal oxide particles, wherein the amount of aggregate metal oxide particles in the dispersion is within the range 0.8 L-1.2 L, and L is determined by formula (I), above, and (d) milling the aggregate metal oxide particle dispersion using a high-shear mixer, whereby the aggregate particle diameter of the aggregate metal oxide particles is reduced to provide a dispersion of aggregate metal oxide particles having about the pre-selected average aggregate particle diameter.

When a dispersion standard is used to determine the appropriate solids concentration of the dispersion, the aggregate metal oxide particles are combined with water or other suitable dispersion liquid to provide a dispersion having a solids concentration that is within 10% of the predetermined solids concentration, preferably within 5% of the predetermined solids concentration, or within 2% or exactly the predetermined solids concentration.

Increasing the solids concentration of the dispersion and, thus, the viscosity of the dispersion, increases the shear energy present during milling. The shear energy, in turn, breaks down the aggregate particles, resulting in a decrease in the average aggregate particle size without changing the surface area of the particles. By controlling the solids concentration of the dispersion, the resulting average aggregate particle diameter can be controlled. A relatively high solids concentration may be required to attain a desired percent-reduction in particle diameter. The solids concentration of the dispersion can be increased by increasing the amount of aggregate metal oxide particles in the dispersion, or by incorporating other materials in the dispersion, such as fillers or other grinding/milling aids. Increased concentrations of aggregate metal oxide particles, and thus higher solids concentrations, can be obtained by incrementally adding the aggregate metal oxide particles to the dispersion liquid. Preferably, the aggregate metal oxide particles are combined with the water by a method comprising (a) adding a first portion of the aggregate metal oxide particles to the water to provide a first aggregate metal oxide particle dispersion, (b) milling the first aggregate metal oxide particle dispersion, (c) adding a second portion of aggregate metal oxide particles to the first metal oxide particle dispersion to provide a second aggregate metal oxide particle dispersion, and (d) milling the second aggregate metal oxide particle dispersion. Steps (c) and (d) can be repeated with a third, forth, or fifth portion (or more portions) of aggregate metal oxide particles, as needed, up to the point that no additional aggregate metal oxide particles can be dispersed. Preferably, the viscosity of the first aggregate metal oxide particle dispersion is reduced by about 5% or more (or about 10% or more, or even 15% or more) before the addition of the second portion of aggregate metal oxide particles, and between the second and third portions and so on.

The solids concentration of the dispersion is the total amount of all solids in the dispersion, which solids comprise the aggregate metal oxide particles as well as any other solids (e.g., fillers, milling aids, etc.) included in the dispersion. Typically, the solids in the dispersion consist essentially of or consist entirely of the aggregate metal oxide particles. The total solids content, or total amount of aggregate metal oxide particles, of the dispersion is not limited and will depend, at least in part, on the desired percent-reduction in aggregate particle diameter and the type of milling device used. Whether determined using a dispersion standard or by another method, the total solids concentration of the dispersion usually will be about 15 wt. % or more (e.g., about 15-70 wt. %), preferably about 20 wt. % or more (e.g., about 20-60 wt. %), or even about 30 wt. % or more (e.g., about 30-50 wt. %).

As the dipsersibility of the aggregate metal oxide particles depends, at least in part, upon the primary particle size (e.g., surface area), the total solids concentration can be expressed as a function of the maximum dispersible solids concentration for a particular primary particle size. According to one aspect of the invention, the solids concentration of the dispersion (L) for a dispersion of aggregate metal oxide particles having an average primary particle size ($d_p$) satisfies the following equation:

$$80[0.1 \ln(d_p)(\text{nm})+0.2] < L(\text{wt. \%}) < 100[0.1 \ln(d_p)(\text{nm})+0.2],$$

or satisfies the following equation:

$$80[0.107 \ln(d_p)(\text{nm})+0.19] < L(\text{wt. \%}) < 100[0.107 \ln(d_p)(\text{nm})+0.19].$$

The dispersion can be prepared using any suitable aqueous dispersion medium in which the aggregate metal oxide particles can be dispersed. Most often, the dispersion medium is water. In order to assist the dispersion of most aggregate metal oxides, especially silica or alumina, a dispersion aid can be included in the dispersion medium prior to the addition of the aggregate metal oxide particles. Suitable dispersion aids include acids, such as mineral acids, and quaternary ammonium bases. The dispersion aid can be used in any amount that assists the dispersion of the aggregate metal oxide particles, but is generally used in small amounts. Typically, the dispersion aid will be present in an amount equal to about 0.01-5 wt. %, such as about 0.05-2 wt. %, or even about 0.1-1 wt. %. The amount of the dispersion can be expressed in terms of the number of mols of acid used per kilogram of metal oxide. Preferably, the dispersion aid is used in an amount equal to 0.02-2 moles of acid per kilogram of metal oxide, more preferably, 0.05-1 mole of acid, or even 0.1-0.8 mols of acid, per kilogram of metal oxide.

Quaternary ammonium bases are particularly suitable for use in dispersing aggregate silica particles. Quaternary ammonium bases that are suitable for use in conjunction with the present invention have the following formula (formula (II)):

$$(NR_1R_2R_3R_4)OH \qquad (II)$$

wherein each of $R_1$, $R_2$, $R_3$, and $R_4$ are independently selected from the group consisting of $C_1$-$C_{10}$ alkyl, $C_1$-$C_{10}$ alkoxy, $C_2$-$C_{10}$ alkenyl, and aryl groups, any of which can be unsubstituted or substituted with $C_1$-$C_{10}$ alkyl, hydroxy, $C_1$-$C_{10}$ alkoxy, or aryl groups. In preferred compounds, each of $R_1$, $R_2$, $R_3$ and $R_4$ are independently $C_1$-$C_3$ alkyl groups. More preferably each of $R_1$, $R_2$, $R_3$ and $R_4$ are independently methyl or ethyl groups. In this respect, the invention provides a method of reducing the average aggregate particle size of aggregate silica particles comprising (a) combining aggregate silica particles comprising fused primary particles having a surface area of about 115 $m^2/g$ or more with water and a quaternary ammonium hydroxide in sufficient quantities to provide a dispersion comprising about 30 wt. % or more aggregate silica particles, and (b) milling the aggregate silica particles using a high-shear mixer, whereby the aggregate particle diameter of the aggregate silica particles is reduced.

When the aggregate metal oxide is alumina, it is much preferred that the dispersion medium is water that has been acidified by addition of an acid, such as HCl, in an amount equal to about 0.1-1.5 wt. % or about 0.5-1 wt. %, which maximizes the concentration of alumina that can be dispersed in water. As expressed in terms of the mols of acid used, it is preferred that 0.02-0.4 mols of acid, or even 0.05-0.2 mols of acid, per kilogram of alumina are used. In this respect, the invention provides a method for reducing the average aggregate particle diameter of aggregate alumina particles comprising (a) combining aggregate alumina particles comprising fused primary particles with water and the above amount of an acid to provide a dispersion comprising about 30 wt. % or more aggregate alumina particles, and (b) milling the dispersion using a high-shear mixer, whereby the aggregate particle diameter of the aggregate alumina particles are reduced.

The method of the invention can be practiced with any type of high-shear milling device. The dispersion standard is, preferably, specific to the particular type or class of high-shear milling device being used, and can be specific to a particular make or model of high-shear milling device being used. Suitable high-shear milling devices include planetary and blade-type mixers, homogenizers, rotor-stators, media mills, ball mills, jet mills, and other common types of high-shear milling devices.

The dispersion can be milled for a specific amount of time, which can be set forth in the dispersion standard, or the dispersion can be milled until the end-point of the milling process has been reached. The end-point of the milling process can be determined by any suitable method. One such method involves monitoring the resistance on the motor of the milling device. As the milling proceeds, the resistance will decrease until the end-point of the milling process is reached, at which point the resistance will become relatively steady. The resistance on the motor can be measured by any method, such as by measuring changes in the electrical current supplied to the motor, by detecting changes in the motor speed, or by detecting audible changes in the device that signify a decrease in the resistance on the motor.

The milling device must supply enough energy to break the bonds between the individual primary particles, which results in a decrease in the average aggregate particle diameter. Preferably, the milling device operating with the dispersion having a given solids concentration will supply about $10^{-4}$ cal/cm$^2$ (e.g., about $10^{-4}$–$^{-3}$ cal/cm$^2$) or more energy. When a blade type mixer is used, the blade-type mixer preferably comprises a blade having a radius (R), a characteristic blade length (X), and an angular velocity ($\omega$) that satisfies the following formula (formula (III)):

$$100 \geq \frac{\eta \omega^2 R^2}{2X^2} \geq 20 \text{ kW/m}^3. \tag{III}$$

In this regard, the invention provides a method of reducing the aggregate particle diameter of aggregate metal oxide particles comprising (a) providing aggregate metal oxide particles comprising fused primary particles, (b) combining the aggregate metal oxide particles with water comprising an acid or a quaternary ammonium hydroxide to provide a dispersion having a viscosity ($\eta$), (b) milling the aggregate metal oxide particle dispersion in a high-shear blade-type mixer, wherein the mixer comprises a blade having a radius (R), a characteristic blade length (X), and an P velocity ($\omega$) that satisfies equation (III) above, whereby the average aggregate particle diameter of the aggregate metal oxide particles is reduced.

A high-shear blade type mixer is especially useful for reducing the aggregate particle diameter of aggregate silica particles having a BET surface area more than about 135 m$^2$/g, which typically requires a dispersion comprising about 30-50 wt. % aggregate silica particles. Thus, in a related aspect the invention provides a method of reducing the aggregate particle diameter of aggregate silica particles comprising (a) providing aggregate silica particles comprising fused primary particles having an average aggregate particle diameter and a BET surface area of about 135 m$^2$/g or more, (b) combining the aggregate silica particles with acidified or basified water in sufficient quantities to provide a dispersion comprising about 30-50 wt. % aggregate silica particles, and (c) milling the aggregate silica particle dispersion in a high-shear blade-type mixer, whereby the average aggregate particle diameter of the aggregate silica particles is reduced. The high shear mixer preferably comprises a blade having a radius (R), a characteristic blade length (X), and an angular velocity ($\omega$) that satisfies formula (III), above.

The method of the invention reduces the average aggregate particle diameter of the aggregate metal oxide particles used in conjunction with the method. The method of the invention also reduces the geometric standard deviation of the aggregate particle sizes of the aggregate metal oxide particles. As used herein, the geometric standard deviation of the aggregate sizes, $\sigma_g$ ($D_{circ}$), is the geometric standard deviation of the aggregate diameters, for the aggregate metal oxide particles of dispersion (e.g., about 2000 or more aggregates) and represents the aggregate size distribution for the aggregate metal oxide particles. The $D_{circ}$ values for the aggregate metal oxide particles are geometric number averages. The geometric number averages as well as the geometric standard deviation can be calculated by any suitable method, such as the method described in T. Kodas and M Hampden-Smith, *Aerosol Processing of Materials*, 28-31 (John Wiley & Sons 1999). The method of the invention preferably reduces the $\sigma_g$ ($D_{circ}$) by about 10% or more (e.g., about 15% or more), preferably by about 20% or more (e.g., about 25% or more), or even about 30% or more (e.g., 35% or more) or 40% or more (e.g., 45% or more).

After milling, the aggregate metal oxide dispersion can be diluted with water or other suitable liquid. The aggregate metal oxide dispersion can be diluted to any solids concentration. Preferably, the milled dispersion is diluted to reduce the solids concentration of the dispersion by about 5% or more (e.g., by about 10% or more), or even by about 15% or more (e.g. by about 20% or more). The resulting dispersion will typically have a solids concentration of about 5-50 wt. % (e.g., about 10-45 wt. %), such as about 15-40 wt. % (e.g., about 20-35 wt. %).

The dispersion also can be stabilized after milling by the addition of any suitable stabilizer. Preferably, the dispersion is stabilized by addition of a base in sufficient quantities to raise the pH of the dispersion to about 7 or more (e.g., about 8 or more), or even about 9 or more (e.g., about 10 or more). More preferably, the pH of the diluted and stabilized dispersion has a pH of about 8-13, or even about 9-12. Suitable stabilizers include alkalis or amines, such as sodium hydroxide, potassium hydroxide, lithium hydroxide, ammonium hydroxide, triethylamine, and dimethylethanol amine Also part of the invention is an aqueous dispersion of metal oxide particles prepared in accordance with the invention. In particular, the invention provides a dispersion of aggregate silica particles comprising aggregate silica particles having an aggregate structure comprised of fused primary particles, wherein the aggregate silica particles have a primary particle diameter and an aggregate particle diameter, and the average of the primary particle diameters ($d_p$), the average (by number) of the aggregate particle diameters ($D_{circ\ ave}$) and the geometric standard deviation of the aggregate particle diameters ($\sigma_g$ ($D_{circ}$)) satisfies at least one of the two following equations:

$$D_{circ\ ave}(\text{nm}) < 52 + 2d_p(\text{nm}), \text{ and} \tag{1}$$

$$\sigma_g(D_{circ}) < 1.44 + 0.011 d_p(\text{nm}). \tag{2}$$

As mentioned above, the $\sigma_g$ ($D_{circ}$) is the geometric standard deviation of the aggregate particle diameters of the aggregate metal oxide particles in the dispersion, which parameter should be based on a population of about 2000 or more (e.g., about 5000 or more, or even 10,000 or more) aggregate metal oxide particles. Thus, the dispersion comprises at least 2000 or more (or 5000 or more, or 10,000 or more) aggregate metal oxide particles, and most dispersions of metal oxide particles will have far greater than this number of aggregate metal oxide particles.

The dispersion of the invention satisfies either equation (1) or (2), and preferably satisfies both equations. More preferably, the dispersion satisfies the following equation:

$$1.44 + 0.011 d_p(\text{nm}) > \sigma_g(D_{circ}) > 1.3 + 0.011 d_p(\text{nm}).$$

The invention also provides a dispersion of aggregate alumina particles having an aggregate structure comprised of fused primary particles, wherein the aggregate alumina particles have a primary particle diameter and an aggregate particle diameter, and the average of the primary particle diameters ($d_p$), the average (by number) of the aggregate particle diameters ($D_{circ\ ave}$) and the geometric standard deviation of the aggregate particle diameters ($\sigma_g(D_{circ})$) satisfies at least one of the two following equations:

$$D_{circ\ ave}(\text{nm}) < 35 + 1.8 d_p(\text{nm}), \text{ and} \quad (1)$$

$$\sigma_g(D_{circ}) < 1.39 + 0.011 d_p(\text{nm}). \quad (2)$$

The alumina dispersion of the invention satisfies either equation (1) or (2), and preferably satisfies both equations. More preferably, the dispersion satisfies the following equation:

$$1.39 + 0.011 d_p(\text{nm}) > \sigma_g(D_{circ}) > 1.3 + 0.011 d_p(\text{nm}).$$

All other aspects of the dispersions are as previously described with respect to the method of the invention.

The aggregate metal oxide dispersion of the invention, as well as the method of the invention, can be used for any purpose. Suitable uses include use in non-slip floor waxes, foamed rubber lattices, paper coatings, sol-gel processes for optical fibers and quartz glassware, thermal insulation, frictionizing, polishing, and the preparation of paints and coatings, especially for coating substrates such as polymer film or paper to provide ink recording media. The narrow particle size distribution makes the dispersion and method of the invention especially useful in chemical-mechanical polishing applications, such as those used in the fabrication of integrated circuits, rigid memory discs, optical fibers, and other substrates.

The following examples further illustrate the invention but, of course, should not be construed as in any way limiting its scope.

EXAMPLE 1

This example illustrates the preparation of a dispersion of aggregate metal oxide particles, and the reduction of the average aggregate particle size of the dispersion, in accordance with the invention. This example also illustrates the preparation of a dispersion standard, in accordance with the invention.

Figure 2:
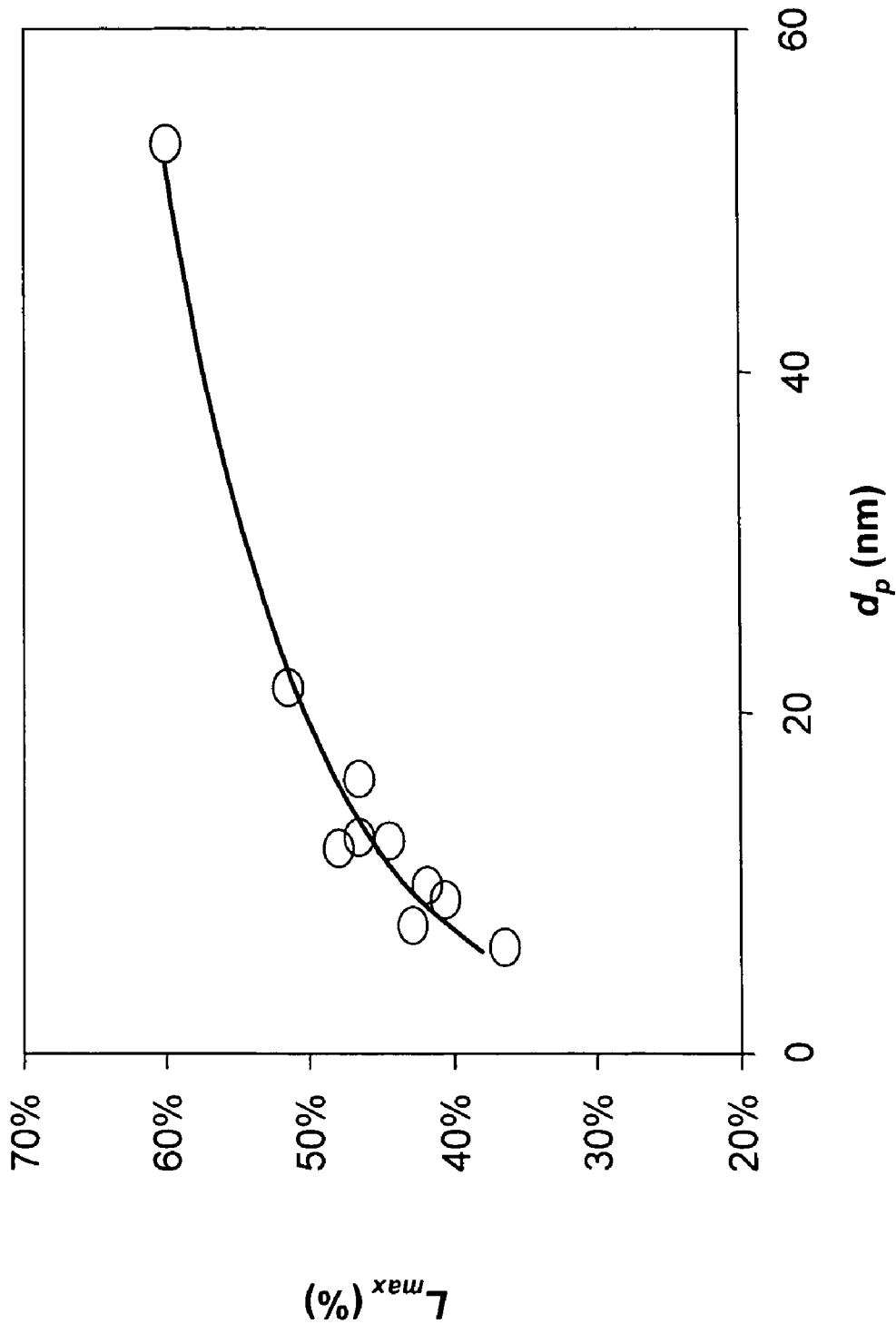
FIG. 2 is a graph of the maximum dispersible solids concentration ($L_{max}$) plotted against primary particle diameter ($d_p$) for fumed silica particles.

The maximum dispersible solids concentration for fumed silica particles was determined for various lots of fumed silica having primary particle diameters ranging from 6 nm to 53 nm, which correspond to a BET surface area range of from about 344 m²/g to about 53 m²/g. The dispersions were prepared by adding about 0.002 g of a 37% HCl solution per gram of fumed silica to 200 g of water to provide a dispersion liquid in a Waring blender. Fumed silica was then added to the acidified water in the Waring blender in aliquots. After each addition, the blender was run at high speed until a noticeable drop in viscosity occurred (about 5 minutes). The next aliquot of fumed silica was added. This procedure was repeated until no additional fumed silica could be dispersed. The results are presented in FIG. 2 as a graph of maximum solids concentration (L) plotted against average primary particle diameter ($d_p$). The relationship between the maximum solids concentration and the average primary particle diameter is represented by the following equation: $L_{max}$ (%) = [0.107 ln($d_p$) + 0.19] × 100.

Dispersions of a representative sampling of the particles were milled at their maximum solids concentrations in a Waring heavy duty blender. After milling, the dispersions were diluted with water and stabilized with a 45% KOH solution to provide a final dispersion with a solids content of about 25-30 wt. % and a pH of about 10-12. The average aggregate particle diameters of the milled particles were measured using TEM analysis. The results are presented in FIG. 1 as a graph of average aggregate particle diameter ($D_{circ\ ave}$) plotted against average primary particle diameter ($d_p$). The top axis of the graph indicates the BET surface area of the particles. The average aggregate particle diameters are shown as circular data points, whereas the straight-lines represent the range of average aggregate particle diameters for the non-milled fumed silica particles. As can be seen from the graph, milling the particles provided a significant reduction in average aggregate particle diameter.

Figure 3:
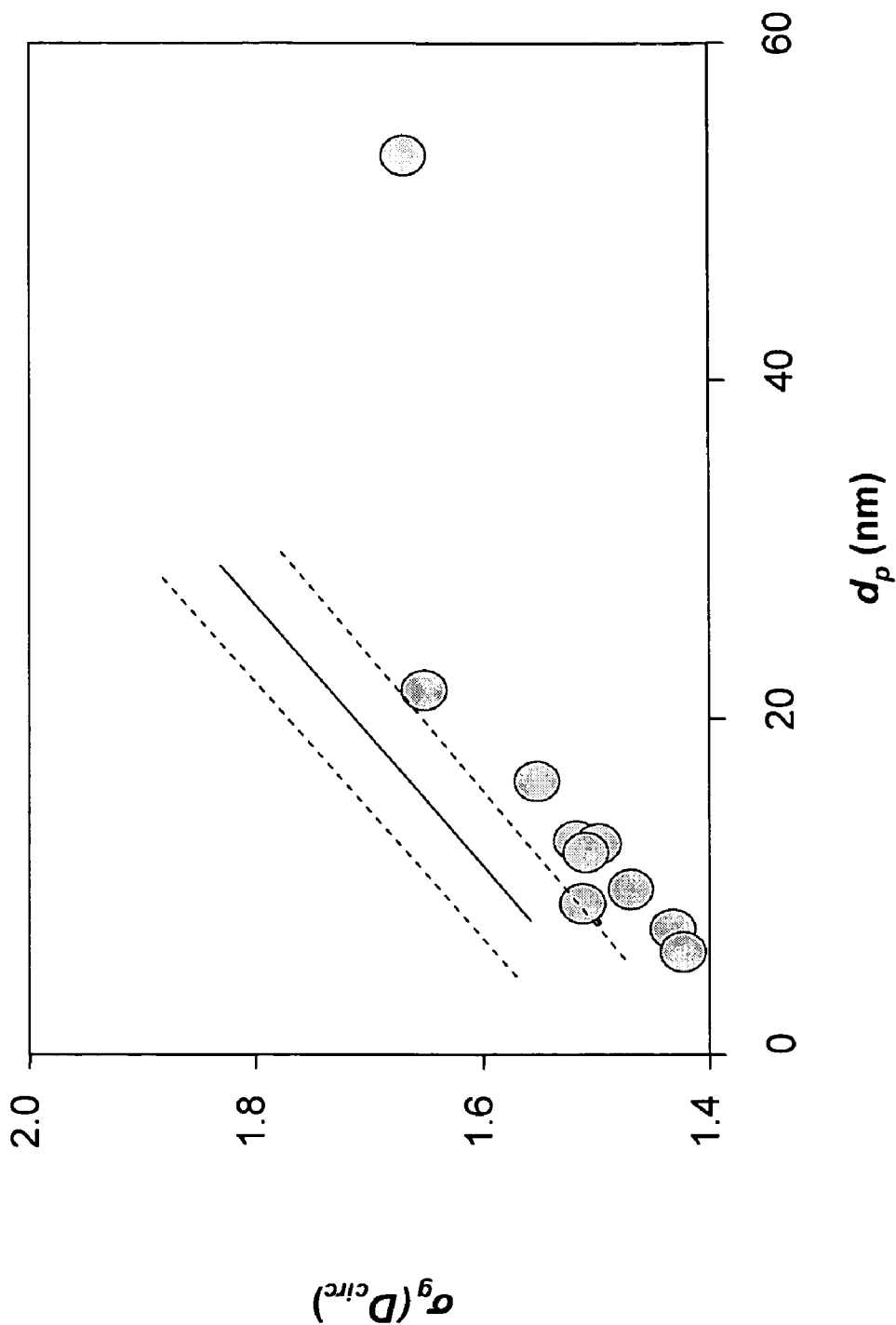
FIG. 3 is a graph of the width of the aggregate particle diameter distribution ($\sigma_g(D_{circ})$) plotted against the primary particle diameter ($d_p$) for fumed silica particles. The straight lines indicate the range of $\sigma_g(D_{circ})$ before milling, and the circular data points indicate the $\sigma_g$ ($D_{circ}$) after milling.

The width of the aggregate particle diameter distribution ($\sigma_g(D_{circ})$) of each milled sample was determined before and after milling. The results are presented in FIG. 3, wherein the straight lines represent the range of $\sigma_g(D_{circ})$ values prior to milling, and the circular data points represent the $\sigma_g(D_{circ})$ of each sample after milling. As the results show, milling the particle dispersions significantly reduced the $\sigma_g(D_{circ})$ values of the particles.

A dispersion of fumed silica particles having a primary particle diameter of 22 nm was prepared at an intermediate solids concentration of 35 wt. % (less than two-thirds of its maximum solids concentration of about 55 wt. %). The dispersion was prepared by adding 0.24 grams of a 37% HCl solution to 200 g of water to provide the dispersion liquid, and adding 108 g fumed silica to the dispersion liquid in a Waring blender. The fumed silica was added to the blender in a single step. After milling for about 5 minutes, 124 g of water and 4 grams of a 45% KOH solution were added to the dispersion to provide a final dispersion with a solids content of about 25% and a pH of about 10-12. The average aggregate particle diameter of the milled dispersion was about 88 nm, which represents a 30% reduction from the average aggregate particle diameter of the non-milled powder (126 nm). This illustrates that a level of solids that is less than the maximum dispersible solids concentration can be used to provide a lower percent-reduction in particle size, thus providing a method for controlling the percent-reduction in average aggregate particle size.

The average aggregate particle diameter of a dispersion of the same metal oxide particles milled at its maximum concentration of about 55 wt. % was about 77 nm, which represents a 39% reduction in the average aggregate particle diameter. The higher concentration dispersion was prepared by adding 0.5 g of a 37% HCl solution to 200 g of water in a Waring blender, followed by the addition of about 203 g of fumed silica. The dispersion was milled for about 10-20 minutes at about 10,000 rpm. Then, an additional 25 g of silica was added to the blender and milled for about 5 minutes. The final 25 g aliquot of fumed silica was added to the blender to provide a total solids concentration of about 55 wt. %, and grinding was continued for about 15 minutes. The dispersion was diluted with 372 g of water and stabilized with 9.8 g of 45 wt. % KOH to provide a final solids concentration of about 30 wt. % and a pH of about 10-12.

By plotting the percent reduction in average aggregate particle diameter against the percentage of the maximum dispersible solids concentration and interpolating between the data points, this example shows that the percent reduction in average aggregate particle diameter (% $\Delta_{DCirc\ ave}$) is related to the maximum solids concentration ($L_{max}$) and to the actual (intermediate) solids concentration (L) by the following relationship:

$$\%\ \Delta_{Dcirc\ ave} = 0.3\ L_{max} = 0.3[(L/L_{max}) \times 100]$$

By combining the above equations ($L_{max}(\%)=[0.107\ \ln(d_p)+0.19]\times 100$ and % $\Delta_{Dcir} = 0.3\ L_{max} = 0.3\ [(L/L_{max}) \times 100]$) and solving for L, the following relationship is obtained:

$$L(\text{wt. \%}) = [(\%\ \Delta_{Dcirc\ ave}) \times (0.107\ \ln(d_p)(nm)+0.19)] \div 0.3$$

This relationship can serve as a dispersion standard for other dispersions of fumed silica having the same or different primary particle size (e.g., surface area).

EXAMPLE 2

This example demonstrates that the dispersion standard of Example 1 can be used to prepare a dispersion of aggregate metal oxide particles having a desired percent-reduction in particle size.

200 g of water and 0.3 g of a 37% HCl solution were combined in a Waring blender. 114 g of fumed silica having a primary particle size of 6 nm was weighed out. 40% of the fumed silica was added to the blender and was milled for about 10-20 minutes. Milling was stopped, and the walls of the blender were scraped. Milling was continued for an additional 5 minutes at 10,000 rpm, followed by the addition of another aliquot of 40% of the fumed silica. The milling was continued for 5 minutes, and the remaining 20% of the fumed silica was added. The total solids content after addition of all of the fumed silica was about 36 wt. %. After 15 minutes of additional milling, the dispersion was diluted with 252 g water and stabilized with 4.4 grams of 45 wt. % KOH to provide a dispersion with 20 wt. % solids and a pH of 10-12.

The average aggregate particle size of the fumed silica particles prior to milling was 72 nm. After milling, the average aggregate particle size was reduced to about 49 nm, corresponding to a reduction of about 32%. According to the dispersion standard of Example 1, a desired percent-reduction in particle size of 32% for an aggregate particle having a primary particle size of 6 nm correlates to a suggested solids concentration of about 36%. The actual amount used in this example was within 5% of the suggested value, demonstrating that the dispersion standard can provide an effective guide for correlating the solids concentration required to attain a given percent reduction in average aggregate particle diameter.

EXAMPLE 3

This example illustrates the use of the method of the invention to reduce the average aggregate particle diameter of fumed alumina particles.

210 g of water and 7.5 g of a 37% HCl solution was combined in a Waring blender. 360 grams of 55 m$^2$/g fumed alumina was weighed out. 60% of the alumina was added to the blender and was milled for 10 to 20 minutes. Milling was stopped, and the walls of the blender were scraped. Milling was continued at 10,000 rpm for 5 minutes. The remaining 40% of the fumed alumina was added, followed by additional milling for 15 minutes. The final solids concentration at this point was 63%. The dispersion was diluted with 327 g of water to provide a 40% alumina dispersion.

The average aggregate particle diameter of the fumed alumina particles before milling was about 22 nm. After milling, the average aggregate particle diameter was reduced by about 33% to about 68 nm. This example demonstrates that the method of the invention can be used to effectively provide a dispersion of aggregate alumina particles with a reduced average aggregate particle size.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of preparing a dispersion of aggregate metal oxide particles having a pre-selected average aggregate particle diameter comprising
   (a) providing aggregate metal oxide particles comprised of fused primary particles having an average aggregate particle diameter and an average primary particle diameter, (b) pre-selecting a desired percent-reduction in the average aggregate particle diameter of the metal oxide particles to provide a pre-selected average aggregate particle diameter, (c) providing a dispersion standard pertaining to a dispersion of the aggregate metal oxide particles, wherein the dispersion standard correlates (i) the solids concentration of the dispersion with (ii) the percent-reduction in the aggregate particle diameter of the aggregate metal oxide particles that occurs when the dispersion is milled in a high-shear mixer, (d) determining a solids concentration that correlates to the pre-selected percent-reduction in the average aggregate particle diameter of the metal oxide particles by reference to the dispersion standard, (e) combining the aggregate metal oxide particles of step (a) with water to provide a dispersion having a solids concentration that is within 10% of the solids concentration determined in step (d), and (f) milling the dispersion in a high-shear milling device to provide a dispersion of aggregate metal oxide particles having about the pre-selected average aggregate particle diameter.

2. The method of claim 1 further comprising providing the dispersion standard by a method comprising (c-1) preparing three or more dispersions of metal oxide particles having the same particle diameter characteristics as the metal oxide particles of step (a), wherein each dispersion has a different solids concentration, (c-2) milling the dispersions in a high-shear mixer, (c-3) calculating the percent-reduction in average aggregate particle diameter for each dispersion by comparing the average aggregate particle diameter of each milled dispersion with the average aggregate particle diameter of the dispersion before milling, and (c-4) describing the correlation between the solids concentration of the dispersions and the percent-reduction in average aggregate particle diameter.

3. The method of claim 1, wherein the aggregate metal oxide particles are silica particles, alumina particles, ceria particles, or a mixture thereof.

4. The method of claim 3, wherein dispersion standard is provided by the following equation:

$$L(\text{wt. \%}) = [(\% \Delta_{Dcirc\ ave}) \times (0.1 \ln(d_p)(\text{nm}) + 0.2)] \div 0.3,$$

wherein L is the solids concentration of the dispersion, $\% \Delta_{Dcirc\ ave}$ is the percent-reduction in average aggregate particle diameter, and $d_p$ is the average primary particle diameter of the aggregate metal oxide particles.

5. The method of claim 1, wherein the aggregate metal oxide particles are silica particles.

6. The method of claim 1, wherein the aggregate metal oxide particles are combined with the water by a method comprising (i) adding a first portion of the aggregate metal oxide particles to the water to provide a first aggregate metal oxide particle dispersion, (ii) milling the first aggregate metal oxide particle dispersion, (iii) adding a second portion of aggregate metal oxide particles to the first metal oxide particle dispersion to provide a second aggregate metal oxide particle dispersion, and (iv) milling the second aggregate metal oxide particle dispersion.

7. The method of claim 6, wherein the viscosity of the first aggregate metal oxide particle dispersion is reduced by about 5% or more before the addition of the second portion of aggregate metal oxide particles.

8. The method of claim 1, wherein the desired percent-reduction is about 10-60%.

9. The method of claim 1, wherein the aggregate metal oxide dispersion comprises about 0.02-2 mols of an acid per kilogram of aggregate metal oxide.

10. The method of claim 1, wherein the aggregate metal oxide dispersion comprises about 0.02-2 mols of a quaternary ammonium hydroxide per kilogram of aggregate metal oxide.

11. The method of claim 10, wherein the quaternary ammonium hydroxide has the formula

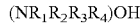

(NR$_1$R$_2$R$_3$R$_4$)OH wherein each of R$_1$, R$_2$, R$_3$, and R$_4$ are independently selected from the group consisting of C$_1$-C$_{10}$ alkyl, C$_1$-C$_{10}$ alkoxy, C$_2$-C$_{10}$ alkenyl, and aryl groups, any of which can be unsubstituted or substituted with C$_1$-C$_{10}$ alkyl, hydroxy, C$_1$-C$_{10}$ alkoxy, or aryl groups.

12. The method of claim 11, wherein each of R$_1$, R$_2$, R$_3$ and R$_4$ are independently C$_1$-C$_3$ alkyl groups.

13. The method of claim 12, wherein each of R$_1$, R$_2$, R$_3$ and R$_4$ are independently methyl or ethyl groups.

14. The method of claim 1, wherein the aggregate metal oxide particles are alumina particles.

15. The method of claim 14, wherein the dispersion comprises about 0.1 wt. % to about 1 wt. % of an acid.

16. The method of claim 1, wherein milling the aggregate metal oxide dispersion reduces the geometric standard deviation ($\sigma_g(D_{circ})$) of the aggregate particle diameter of the metal oxide particles by about 20% or more.

17. The method of claim 1, wherein the aggregate metal oxide particle dispersion is milled in a high-shear blade-type mixer, and the mixer comprises a blade having a radius (R), a characteristic blade length (X), and an angular velocity ($\omega$) that satisfies the following equation:

$$100 \geq \frac{\eta \omega^2 R^2}{2X^2} \geq 20 \text{ kW/m}^3.$$

18. A method of reducing the aggregate particle diameter of aggregate metal oxide particles comprising (a) providing aggregate metal oxide particles comprised of fused primary particles having an average aggregate particle diameter, (b) combining the aggregate metal oxide particles with water comprising an acid or a quaternary ammonium hydroxide to provide a dispersion having a viscosity ($\eta$), (c) milling the aggregate metal oxide particle dispersion in a high-shear blade-type mixer, wherein the mixer comprises a blade having a radius (R), a characteristic blade length (X), and an angular velocity ($\omega$) that satisfies the following equation:

$$100 \geq \frac{\eta \omega^2 R^2}{2X^2} \geq 20 \text{ kW/m}^3,$$

whereby the average aggregate particle diameter of the aggregate metal oxide particles is reduced.

19. The method of claim 18, wherein the aggregate metal oxide particles are combined with the water by a method comprising (i) adding a first portion of the aggregate metal oxide particles to the water to provide a first aggregate metal oxide particle dispersion,
(ii) milling the first aggregate metal oxide particle dispersion,
(iii) adding a second portion of aggregate metal oxide particles to the first metal oxide particle dispersion to provide a second aggregate metal oxide particle dispersion, and
(iv) milling the second aggregate metal oxide particle dispersion.

20. The method of claim 19, wherein the viscosity of the first aggregate metal oxide particle dispersion is reduced by about 5% or more before the addition of the second portion of aggregate metal oxide particles.

21. The method of claim 18, wherein the number average aggregate particle diameter of the aggregate metal oxide particles is reduced by about 10% or more.

22. The method of claim 21, wherein the number average aggregate particle diameter of the aggregate metal oxide particles is reduced by about 20% or more.

23. The method of claim 18, wherein the aggregate metal oxide particles have an average primary particle diameter ($d_p$), and the amount of aggregate metal oxide particles in the dispersion (L) satisfies the following equation:

$$80[0.1 \ln(d_p)(\text{nm})+0.2] < L(\text{wt. \%}) < 100[0.1 \ln(d_p)(\text{nm})+0.2].$$

24. The method of claim 18, wherein the aggregate metal oxide particles are selected from the group consisting of silica, alumina, and ceria particles.

25. The method of claim 24, wherein the aggregate metal oxide particles are alumina particles.

26. The method of claim 25, wherein the dispersion comprises about 0.1 wt. % to about 1 wt.% of an acid.

27. The method of claim 24, wherein the aggregate metal oxide particles are silica particles.

28. The method of claim 18, wherein the aggregate metal oxide dispersion comprises about 0.02-2 mols of an acid per kilogram of aggregate metal oxide particles.

29. The method of claim 18, wherein the aggregate metal oxide dispersion comprises about 0.02-2 mols of a quaternary ammonium hydroxide per kilogram of aggregate metal oxide particles.

30. The method of claim 29, wherein the quaternary ammonium hydroxide has the formula (NR$_1$R$_2$R$_3$R$_4$)OH wherein each of $R_1$, $R_2$, $R_3$, and $R_4$ are independently selected from the group consisting of $C_1$-$C_{10}$ alkyl, $C_1$-$C_{10}$ alkoxy, $C_2$-$C_{10}$ alkenyl, and aryl groups, any of which can be unsubstituted or substituted with $C_1$-$C_{10}$ alkyl, hydroxy, $C_1$-$C_{10}$ alkoxy, or aryl groups.

31. The method of claim 30, wherein each of $R_1$, $R_2$, $R_3$ and $R_4$ are independently $C_1$-$C_3$ alkyl groups.

32. The method of claim 31, wherein each of $R_1$, $R_2$, $R_3$ and $R_4$ are independently methyl or ethyl groups.

33. The method of claim 18, wherein milling the aggregate metal oxide dispersion reduces the geometric standard deviation ($\sigma_g(D_{circ})$) of the aggregate particle diameter of the metal oxide particles by about 20% or more.

34. A method of reducing the aggregate particle diameter of aggregate silica particles comprising
(a) providing aggregate silica particles comprising fused primary particles having an average aggregate particle diameter and having a BET surface area of about 135 m$^2$/g or more (b) combining the aggregate silica particles with acidified or basified water in sufficient quantities to provide a dispersion comprising about 30-50 wt. % aggregate silica particles, and
(c) milling the aggregate silica particle dispersion in a high-shear blade-type mixer, whereby the average aggregate particle diameter of the aggregate silica particles is reduced.

35. The method of claim 34, wherein the aggregate silica particles are combined with the acidified or basified water by a method comprising
(i) adding a first portion of the aggregate silica particles to the acidified or basified water to provide a first aggregate silica particle dispersion,
(ii) milling the first aggregate silica particle dispersion,
(iii) adding a second portion of aggregate silica particles to the first metal oxide particle dispersion to provide a second aggregate silica particle dispersion, and
(iv) milling the second aggregate silica particle dispersion.

36. The method of claim 35, wherein the viscosity of the first aggregate silica particle dispersion is reduced by about 5% or more before the addition of the second portion of aggregate silica particles.

37. The method of claim 34, wherein the number average aggregate particle diameter of the aggregate silica particles is reduced by about 10% or more.

38. The method of claim 37, wherein the number average aggregate particle diameter of the aggregate silica particles is reduced by about 20% or more.

39. The method of claim 34, wherein the dispersion comprises about 0.01-5 wt. % of an acid.

40. The method of claim 34, wherein the aggregate silica particles have an average primary particle diameter ($d_p$), and the amount of aggregate silica particles in the dispersion (L) satisfies the following equation:

$$80[0.1 \ln(d_p)(\text{nm})+0.2] < L(\text{wt. \%}) < 100[0.1 \ln(d_p)(\text{nm})+0.2].$$

41. The method of claim 34, wherein milling the aggregate silica dispersion reduces the geometric standard deviation ($\sigma_g(D_{circ})$) of the aggregate particle diameter of the aggregate silica particles by about 20% or more.

42. The method of claim 34, wherein the aggregate silica dispersion has a viscosity ($\eta$), and the milling of the aggregate silica dispersion is performed using a high-shear blade-type mixer comprising a blade having a radius (R), a characteristic blade length (X), and an angular velocity ($\omega$) that satisfies the following equation:

$$100 \geq \frac{\eta \omega^2 R^2}{2X^2} \geq 20 \text{ kW/m}^3.$$

43. A method of preparing a dispersion of aggregate metal oxide particles having a pre-selected average aggregate particle diameter comprising
(a) providing aggregate metal oxide particles comprising fused primary particles having an average primary particle diameter ($d_p$) and an average aggregate particle diameter ($D_{circ\ ave}$),
(b) pre-selecting a desired percent-reduction in the average aggregate particle diameter (% $\Delta_{Dcirc\ ave}$) of about 10% to about 60% to provide a pre-selected average aggregate particle diameter,
(c) combining the aggregate metal oxide particles with water to provide a dispersion of aggregate metal oxide particles, wherein the amount of aggregate metal oxide particles in the dispersion is within the range 0.8 L-1.2 L, and L is determined by the following equation:

$$L(\text{wt. \%}) = [(\% \Delta_{D_{circ\ ave}}) \times (0.1 \ln(d_p)(\text{nm}) + 0.2)] \div 0.3,$$

and (d) milling the aggregate metal oxide particle dispersion using a high-shear mixer, whereby the aggregate particle diameter of the aggregate metal oxide particles is reduced to provide a dispersion of aggregate metal oxide particles having about the pre-selected average aggregate particle diameter.

44. The method of claim 43, wherein the aggregate metal oxide particles are silica particles, alumina particles, ceria particles, or a combination thereof.

45. The method of claim 44, wherein the aggregate metal oxide particles are silica.

46. The method of claim 45, wherein the aggregate silica particles are combined with the acidified water by a method comprising
   (i) adding a first portion of the aggregate silica particles to the acidified water to provide a first aggregate silica particle dispersion,
   (ii) milling the first aggregate silica particle dispersion,
   (iii) adding a second portion of aggregate silica particles to the first aggregate silica particle dispersion to provide a second aggregate silica particle dispersion, and
   (iv) milling the second aggregate silica particle dispersion.

47. The method of claim 46, wherein the viscosity of the first aggregate silica particle dispersion is reduced by about 5% or more before the addition of the second portion of aggregate silica particles.

48. The method of claim 45, wherein the number average aggregate particle diameter of the aggregate silica particles is reduced by about 10% or more.

49. The method of claim 48, wherein the number average aggregate particle diameter of the aggregate silica particles is reduced by about 20% or more.

50. The method of claim 45, wherein the dispersion comprises about 0.02-2 mols of an acid per kilogram of aggregate silica particles.

51. The method of claim 45, wherein milling the aggregate silica dispersion reduces the geometric standard deviation ($\sigma_g$ ($D_{circ}$)) of the aggregate particle diameter of the aggregate silica particles by about 20% or more.

52. The method of claim 45, wherein the aggregate silica dispersion has a viscosity ($\eta$), and the milling of the aggregate silica dispersion is performed using a high-shear blade-type mixer, and the mixer comprises a blade having a radius (R), a characteristic blade length (X), and an angular velocity ($\omega$) that satisfies the following equation:

$$100 \geq \frac{\eta \omega^2 R^2}{2X^2} \geq 20 \text{ kW/m}^3.$$

53. A method of reducing the aggregate particle diameter of aggregate silica particles comprising
   (a) combining aggregate silica particles comprising fused primary particles having an average aggregate particle diameter and a surface area of about 115 m²/g or more with water and a quaternary ammonium hydroxide in sufficient quantities to provide a dispersion comprising about 30 wt. % or more aggregate silica particles, and (b) milling the aggregate silica particles using a high-shear mixer, whereby the average aggregate particle diameter of the aggregate silica particles is reduced.

54. The method of claim 53, wherein the quaternary ammonium hydroxide has the formula $$(NR_1R_2R_3R_4)OH$$

wherein each of $R_1$, $R_2$, $R_3$, and $R_4$ are independently selected from the group consisting of $C_1$-$C_{10}$ alkyl, $C_1$-$C_{10}$ alkoxy, $C_2$-$C_{10}$ alkenyl, and aryl groups, any of which can be unsubstituted or substituted with $C_1$-$C_{10}$ alkyl, hydroxy, $C_1$-$C_{10}$ alkoxy, or aryl groups.

55. The method of claim 54, wherein each of $R_1$, $R_2$, $R_3$, and $R_4$ is independently a $C_1$-$C_3$ alkyl group.

56. The method of claim 55, wherein each of $R_1$, $R_2$, $R_3$, and $R_4$ is independently a methyl or ethyl group.

57. The method of claim 53, wherein the aggregate silica particles are combined with the water and quaternary ammonium hydroxide by a method comprising
   (i) adding a first portion of the aggregate silica particles to the water and quaternary ammonium hydroxide to provide a first aggregate silica particle dispersion,
   (ii) milling the first aggregate silica particle dispersion,
   (iii) adding a second portion of aggregate silica particles to the first aggregate silica particle dispersion to provide a second aggregate silica particle dispersion, and
   (iv) milling the second aggregate silica particle dispersion.

58. The method of claim 57, wherein the viscosity of the first aggregate silica dispersion is reduced by at about 5% or more before the addition of the second portion of aggregate silica particles.

59. The method of claim 53, wherein the number average aggregate particle diameter of the aggregate silica particles is reduced by at about 10% or more.

60. The method of claim 59, wherein the number average aggregate particle diameter of the aggregate silica particles is reduced by about 20% or more.

61. The method of claim 53, wherein the aggregate silica particles have an average primary particle diameter ($d_p$), and the amount of aggregate silica particles in the dispersion (L) satisfies the following equation:

$$80[0.1 \ln(d_p)(\text{nm}) + 0.2] < L(\text{wt. \%}) < 100[0.1 \ln(d_p)(\text{nm}) + 0.2].$$

62. The method of claim 53, wherein the dispersion comprises about 0.02-2 mols of the quaternary ammonium hydroxide per kilogram of aggregate silica particles.

63. The method of claim 53, wherein milling the aggregate silica dispersion reduces the geometric standard deviation ($\sigma_g$ ($D_{circ}$)) of the aggregate particle diameter of the aggregate silica particles by about 20% or more.

64. The method of claim 53, wherein the aggregate silica dispersion has a viscosity ($\eta$), and the milling of the aggregate silica dispersion is performed using a high-shear blade-type mixer, and the mixer comprises a blade having a radius (R), a characteristic blade length (X), and an angular velocity ($\omega$) that satisfies the following equation:

$$100 \geq \frac{\eta \omega^2 R^2}{2X^2} \geq 20 \text{ kW/m}^3.$$

65. A method of reducing the aggregate particle diameter of aggregate alumina particles comprising
   (a) combining aggregate alumina particles comprising fused primary particles with water and about 0.02-0.4 mols of an acid per kilogram of aggregate alumina particles to provide a dispersion comprising about 30 wt. % or more aggregate alumina particles, and (b) milling the dispersion using a high-shear mixer, whereby the aggregate particle diameter of the aggregate alumina particles are reduced.

66. The method of claim 65, wherein the aggregate alumina particles are combined with the acidified water by a method comprising
   (i) adding a first portion of the aggregate alumina particles to the acidified water to provide a first aggregate alumina particle dispersion,
   (ii) milling the first aggregate alumina particle dispersion,
   (iii) adding a second portion of aggregate alumina particles to the first metal oxide particle dispersion to provide a second aggregate alumina particle dispersion, and
   (iv) milling the second aggregate alumina particle dispersion.

67. The method of claim 66, wherein the viscosity of the first aggregate alumina dispersion is reduced by about 5% or more before the addition of the second portion of aggregate alumina particles.

68. The method of claim 65, wherein the number average aggregate particle diameter of the aggregate alumina particles is reduced by about 10% or more.

69. The method of claim 68, wherein the number average aggregate particle diameter of the aggregate alumina particles is reduced by about 20% or more.

70. The method of claim 65, wherein the aggregate alumina particles have an average primary particle diameter ($d_p$), and the amount of aggregate alumina particles in the dispersion (L) satisfies the following equation:

$$80[0.1 \ln(d_p)(\text{nm})+0.2] < L(\text{wt. \%}) < 100[0.1 \ln(d_p)(\text{nm})+0.2].$$

71. The method of claim 65, wherein the aggregate alumina particles have a surface area of about 110 m²/g or less.

72. The method of claim 65, wherein milling the aggregate alumina dispersion reduces the geometric standard deviation ($\sigma_g(D_{circ})$) of the aggregate particle diameter of the aggregate alumina particles by about 30% or more.

73. The method of claim 65, wherein the milling of the aggregate alumina dispersion is performed using a high-shear blade-type mixer, and the mixer has a blade having a radius (R), a characteristic blade length (X), and an angular velocity ($\omega$) that satisfy the following equation:

$$100 \geq \frac{\eta \omega^2 R^2}{2X^2} \geq 20 \text{ kW/m}^3.$$

\* \* \* \* \*